(12) United States Patent
Molyneux et al.

(10) Patent No.: US 12,442,512 B2
(45) Date of Patent: Oct. 14, 2025

(54) LOUVRED LIGHTING FIXTURE

(71) Applicant: TM Lighting Ltd, London (GB)

(72) Inventors: Andrew John Grayshon Molyneux, London (GB); Tom Lorton, London (GB)

(73) Assignee: TM Lighting LTD, London (GB)

( * ) Notice: Subject to any disclaimer, the term of this patent is extended or adjusted under 35 U.S.C. 154(b) by 0 days.

(21) Appl. No.: 18/189,855

(22) Filed: Mar. 24, 2023

(65) Prior Publication Data

US 2023/0304646 A1    Sep. 28, 2023

(30) Foreign Application Priority Data

Mar. 24, 2022    (GB) ...................... 2204207

(51) Int. Cl.
*F21V 11/06*    (2006.01)
*F21S 4/20*    (2016.01)
(Continued)

(52) U.S. Cl.
CPC ............... *F21V 11/065* (2013.01); *F21S 4/20* (2016.01); *F21S 4/28* (2016.01); *F21S 8/033* (2013.01);
(Continued)

(58) Field of Classification Search
CPC ..... F21S 8/033; F21S 4/20; F21S 4/28; F21V 14/02; F21V 14/025; F21V 14/08;
(Continued)

(56) References Cited

U.S. PATENT DOCUMENTS 2,685,023 A    7/1954  Della
2009/0273926 A1*  11/2009  Deng ...................... F21K 9/65
                                                362/249.02
(Continued)

FOREIGN PATENT DOCUMENTS

DE      19954134 A1    5/2001
DE   102016118091 B3   12/2017
(Continued)

OTHER PUBLICATIONS

United Kingdom Patent Application No. GB2204207.1, Combined Search and Examination Report under Sections 17 and 18(3), Sep. 26, 2022, 9 pages.
(Continued)

*Primary Examiner* — Colin J Cattanach
(74) *Attorney, Agent, or Firm* — Tiffany L. Williams IP Law, LLC (57) ABSTRACT

A louvred lighting fixture comprising a lighting assembly and a louvre assembly. The lighting assembly comprises a lighting arm having a light emitting device. The louvre assembly comprises an outer louvre 19 and an inner louvre. The louvred lighting fixture 1 has an axis of rotation X-X, wherein the lighting arm, the outer louvre and the inner louvre each have a longitudinal axis of rotation that is coaxial with the axis of rotation X-X, so that, in use, the outer louvre and the inner louvre are rotated so that the forward light obscuring region and the rearward light obscuring region can be positioned within the beam of light emitted by the light emitting device.

15 Claims, 9 Drawing Sheets

(51) Int. Cl.
  *F21S 4/28* (2016.01)
  *F21S 8/00* (2006.01)
  *F21V 1/10* (2006.01)
  *F21V 7/00* (2006.01)
  *F21V 11/12* (2006.01)
  *F21V 14/02* (2006.01)
  *F21V 14/04* (2006.01)
  *F21V 14/08* (2006.01)

(52) U.S. Cl.
  CPC .................. *F21V 1/10* (2013.01); *F21V 7/005* (2013.01); *F21V 11/12* (2013.01); *F21V 14/02* (2013.01); *F21V 14/025* (2013.01); *F21V 14/04* (2013.01); *F21V 14/045* (2013.01); *F21V 14/08* (2013.01); *F21V 14/085* (2013.01)

(58) Field of Classification Search
  CPC ...... F21V 14/085; F21V 14/04; F21V 14/045; F21V 7/005; F21V 11/12; F21V 1/10
  See application file for complete search history.

(56) References Cited

U.S. PATENT DOCUMENTS

2010/0265716 A1  10/2010  Hood et al.
2017/0307178 A1  10/2017  Joye

FOREIGN PATENT DOCUMENTS

GB      191025371 A    11/1911
GB         454681 A    10/1936
WO       03012825 A2    2/2003

OTHER PUBLICATIONS

GB Patent Application No. GB2204207.1, Examination Report mailed Apr. 12, 2023, 8 pages.
European Patent Application No. EP23163854.5, European Search Report pursuant to Rule 62 EPC, Jul. 21, 2023, 10 pages.

* cited by examiner

LOUVRED LIGHTING FIXTURE

This patent application is related to and claims priority benefits from GB Application Serial No. 2204207.1 ("the '207 application"), filed on Mar. 24, 2022, entitled "A LOUVRED LIGHTING FIXTURE." The '207 application is hereby incorporated in its entirety by this reference.

The present invention relates to a lighting fixture that enables adjustment of the light that it casts upon an object that it is illuminating, for example a painting or a sculpture. The lighting fixture is provided with an arrangement of louvres that can be moved relative to illumination lamps, so that parameters of the illumination, such as glare and light spill can be changed. In optimising the parameters, the object can be illuminated such that it is displayed in the best possible way.

There are many types of lighting fixtures suitable for illuminating paintings or sculptures. A conventional picture light is provided with features that allow the light cast on to an object to be adjusted. However, although existing lighting fixtures can facilitate proper illumination of an object there are situations in which a person viewing an object, such as a painting on a wall in a gallery, may have their viewing experience diminished. For example, a viewer of a painting may experience glare from the lighting fixture, which might occur if the painting is very large and the lighting fixture is placed high up on a wall.

Consequently, there is a need for an improved lighting fixture that can eliminate, or at least minimise, illumination characteristics such as glare and reflection.

Accordingly, the present invention provides a louvred lighting fixture comprising a lighting assembly and a louvre assembly, wherein the lighting assembly comprises a hub, a first lighting arm having a first light emitting device, wherein an inner end of the first lighting arm is attached to the hub on a first side of the hub, wherein the louvre assembly comprises an outer louvre having a forward light obscuring region and a first inner louvre having a rearward light obscuring region, wherein there is a first engagement means for engaging the outer louvre with the lighting assembly and there is a second engagement means for engaging the first inner louvre with the first lighting arm, the louvred lighting fixture having an axis of rotation X-X, wherein the first lighting arm, the outer louvre and the first inner louvre each have a longitudinal axis of rotation that is coaxial with the axis of rotation X-X, so that, in use, when the first lighting arm, the outer louvre and the first inner louvre are rotated about their respective longitudinal axes of rotation they are also rotated about axis X-X, the first light emitting device is arranged so that, in use, it directs a beam of light transversely to the longitudinal axis of the first lighting arm, and the outer louvre and the first inner louvre are arranged so that, in use, the outer louvre and the first inner louvre can be rotated about axis X-X so that the forward light obscuring region and the rearward light obscuring region can be positioned at least partially within the beam of light emitted by the first light emitting device. Preferably, the outer louvre extends over at least part of the hub, first engagement means engages the outer louvre (19) with the hub and the first engagement means is located between the external surface of the hub and the internal surface of the outer louvre.

Preferably, the first inner louvre extends over at least a part of the first lighting arm and the second engagement means is provided by frictional engagement of the external surface of the first lighting arm with the internal surface of the first inner louvre.

Preferably, the first engagement means is an elastically resilient element that frictionally engages with the outer louvre and the hub in a manner that permits relative movement of the outer louvre relative to the hub when a user applies a force to the outer louvre. This is advantageous because it enables the outer louvre to be held in place without the need for any mechanical fixings such as grub screws. This has an aesthetic benefit, because there are no unsightly discontinuities in the outer louvre, it has a manufacturing benefit, because there is no need to drill fixing holes in the outer louvre, and it has an installation benefit, because putting the outer louvre in place on the lighting assembly and adjusting it to the correct position is a simpler and faster operation.

Preferably, the first lighting arm is cylindrical and the first inner louvre has an open cross-sectional profile that extends around the arc of a circle by more than 180° but less than 360°, wherein the internal diameter of the circular cross-sectional profile of the first inner louvre is less than the outer diameter of the first lighting arm, such that at least a part of the first inner louvre is an interference fit with the lighting arm.

Preferably, the louvred lighting fixture further comprises a second lighting arm having a second light emitting device, wherein an inner end of the second lighting arm is attached to the hub on a second side of the hub, and the first side of the hub is located on an opposite side of the hub to the second side of the hub. The lighting arms can be attached to the hub indirectly, e.g. via a locking sleeve, or they can be attached to the hub directly, using any suitable attachment means.

Preferably, the louvred lighting fixture further comprises a second inner louvre, wherein there is a third engagement means for engaging the second inner louvre with the second lighting arm, wherein the second inner louvre has a longitudinal axis of rotation that is coaxial with the axis of rotation X-X, so that, in use, when the second inner louvre is rotated about its respective longitudinal axis of rotation it is also rotated about axis X-X, the second light emitting device is arranged so that, in use, it directs a beam of light transversely to the longitudinal axis of the second lighting arm, and the second inner louvre is arranged so that, in use, the second inner louvre can be rotated about axis X-X so that the rearward light obscuring region can be positioned at least partially within the beam of light emitted by the second light emitting device.

Preferably, the first inner and the second inner louvre are each at least partially located within the outer louvre.

Preferably, the outer louvre is provided with a rotational engagement means at each end, the first lighting arm is provided with a rotational engagement means at its outer end and the second lighting arm is provided with a rotational engagement means at its outer end, wherein the rotational engagement means at one end of the outer louvre is engaged with the rotational engagement means at the outer end of the first lighting arm and the rotational engagement means at the other end of the outer louvre is engaged with the rotational engagement means at the outer end of the second lighting arm.

Preferably, in use, the hub is fixed so that it does not rotate or articulate. Alternatively, the hub can be connected to a mechanism that allows it to rotate or to a mechanism, such as a knuckle joint that allows it to articulate.

Preferably, the first lighting arm and the second lighting arm are rotationally attached to the hub.

Preferably, each of the first inner louvre and the second inner louvre has an open cross-sectional profile that extends around the arc of a circle by more than 180° but less than 360°, wherein the internal diameter of the circular cross-sectional profile of the first inner louvre and of the second inner louvre is less than the outer diameter of the first lighting arm and of the second lighting arm respectively, such that at least a part of the first inner louvre is an interference fit with the first lighting arm and such that at least a part of the second inner louvre is an interference fit with the second lighting arm, wherein the cross-sectional profile is constant along the entire length of the first lighting arm and the second lighting arm.

Preferably, an outer illumination window is provided in the wall of the outer louvre and an inner illumination window is provided in the wall of the first inner louvre, wherein the outer illumination window and the inner illumination window overlap to create a combined illumination window.

Preferably, the outer louvre has an open cross-sectional profile that is constant along the entire length of the outer louvre and an end cap is located at each end of the outer louvre, wherein the outer illumination window is defined by the end caps and by the longitudinal edges of the open cross-sectional profile of the outer louvre. This construction is advantageous because it facilitates making the main body of the outer louvre from an extruded section, which can be readily cut to length, and it facilitates fitting of the end caps with an interference fit, which avoids the need for any welding, brazing or adhesive bonding.

Preferably, the first inner louvre has an open cross-sectional profile that is constant along the entire length of the first inner louvre, wherein the inner illumination window is defined by the longitudinal edges of the open cross-sectional profile of the first inner louvre, by an end cap of the outer louvre and by a bracing plate.

Preferably, the bracing plate is located adjacent to the first side of the hub, and between the hub and the first inner louvre, wherein the external profile of the bracing plate is complementary to the internal profile of the outer louvre such that at least part of the external profile of the bracing plate is held in contact with the internal profile of the outer louvre.

Preferably, the hub, the first lighting arm, the second lighting arm, the first inner louvre and the second inner louvre are all located within the outer louvre.

Preferably, the first inner louvre fits within the outer illumination window of the outer louvre.

According to another aspect of the present invention there is provided a kit of parts for a louvre assembly comprising an outer louvre and an inner louvre, wherein the outer louvre has an open cross-sectional profile that is constant along the entire length of the outer, wherein the inner louvre has an open cross-sectional profile that extends around the arc of a circle by more than 180° but less than 360° and that is constant along the entire length of the inner louvre, and wherein the inner louvre fits within the outer illumination window of the outer louvre.

The present invention will be described here with reference to the following figures.

Figure 1:
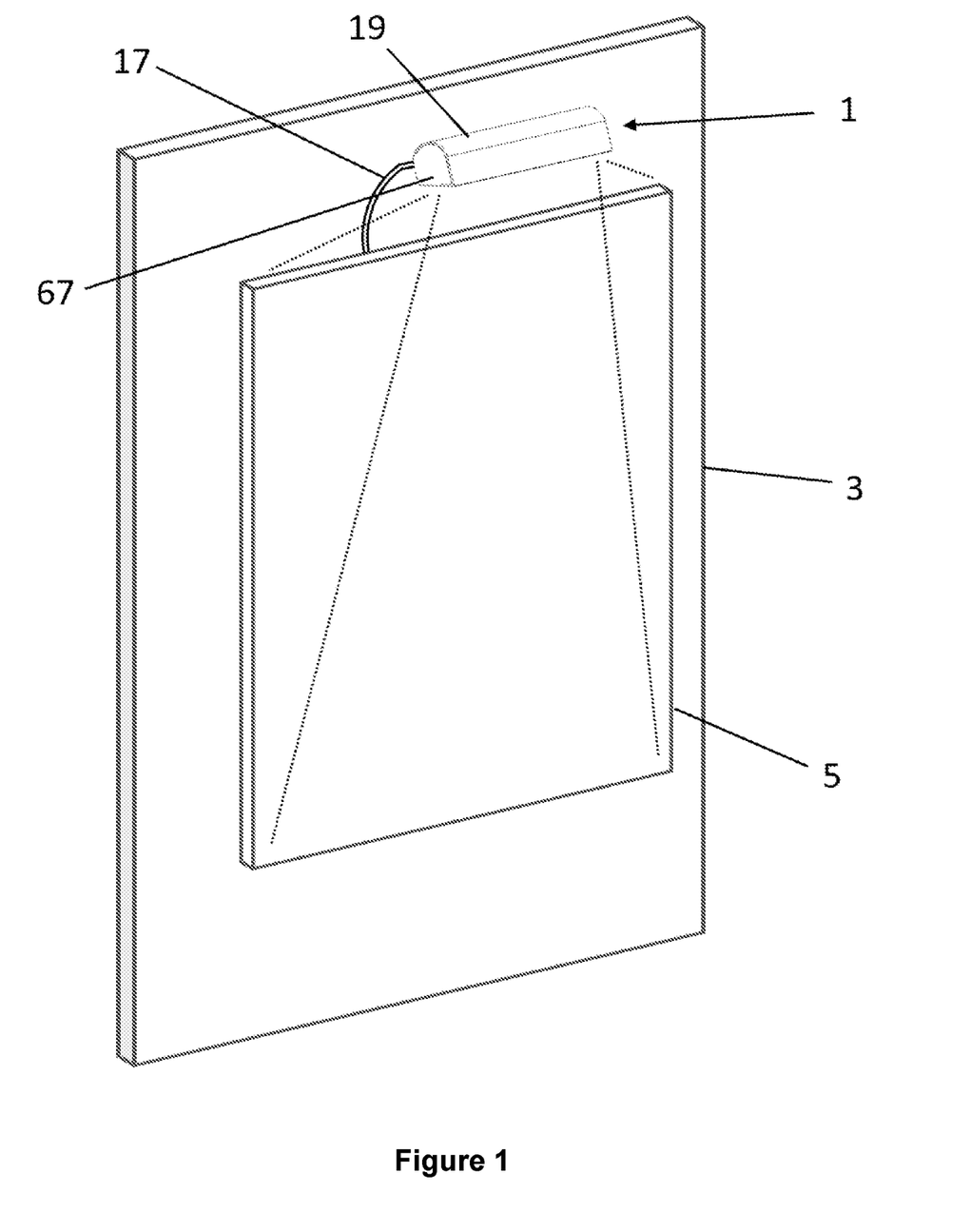
FIG. 1 shows a louvred lighting fixture according a first embodiment of the invention fixed to the back of a painting and illuminating that painting.
Figure 2:
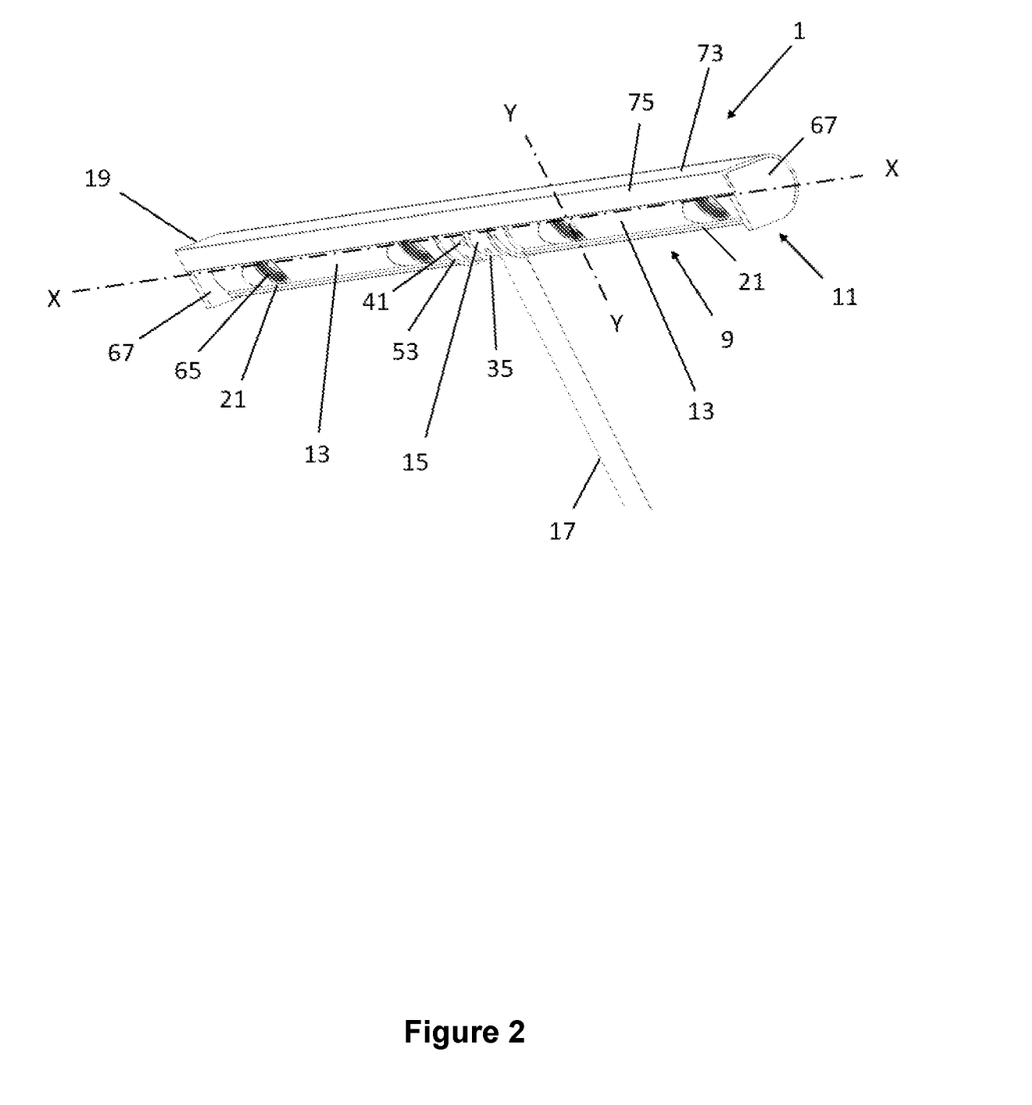
FIG. 2 is a view of the louvred lighting fixture of FIG. 1, viewed from underneath and showing the louvre assembly and the lighting assembly.

An embodiment of a louvred lighting fixture 1 according to the present invention is shown in FIG. 1, fixed to the back of a painting 5 to illuminate that painting 5 with a pool of light 7. The louvred lighting fixture 1 can also be fixed to a wall 3, rather than to the back of the painting 5. FIG. 2 shows the louvred lighting fixture 1 viewed from underneath and illustrating the lighting assembly 9 and the louvre assembly 11.

The lighting assembly 9 comprises two elongate lighting arms 13 that are rotatable relative to a centrally located hub 15, and that can be fixed in position relative to the hub 15, once the orientation desired for the lighting arms 13 has been obtained. A support bracket 17 is fixed to the hub 15 and to the painting 5 to support the louvred lighting fixture 1 in the desired position relative to the painting 5.

The louvre assembly 11 comprises an outer louvre 19 and two inner louvres 21. In the present invention the term 'louvre' is used to describe a component that can block light from a light source, or that can shade a light source or that can filter light from a light source. Similar terms used in the art are, for example, shield, baffle, filter, shroud and screen.

The outer louvre 19 is attached to the lighting assembly 9 and can rotate relative to it about an axis of rotation X-X (shown in FIG. 2). Each of the inner louvres 21 is attached to one of the lighting arms 13 and each inner louvre 21 can rotate relative to its respective lighting arm 13 about the axis of rotation X-X.

Figure 3:
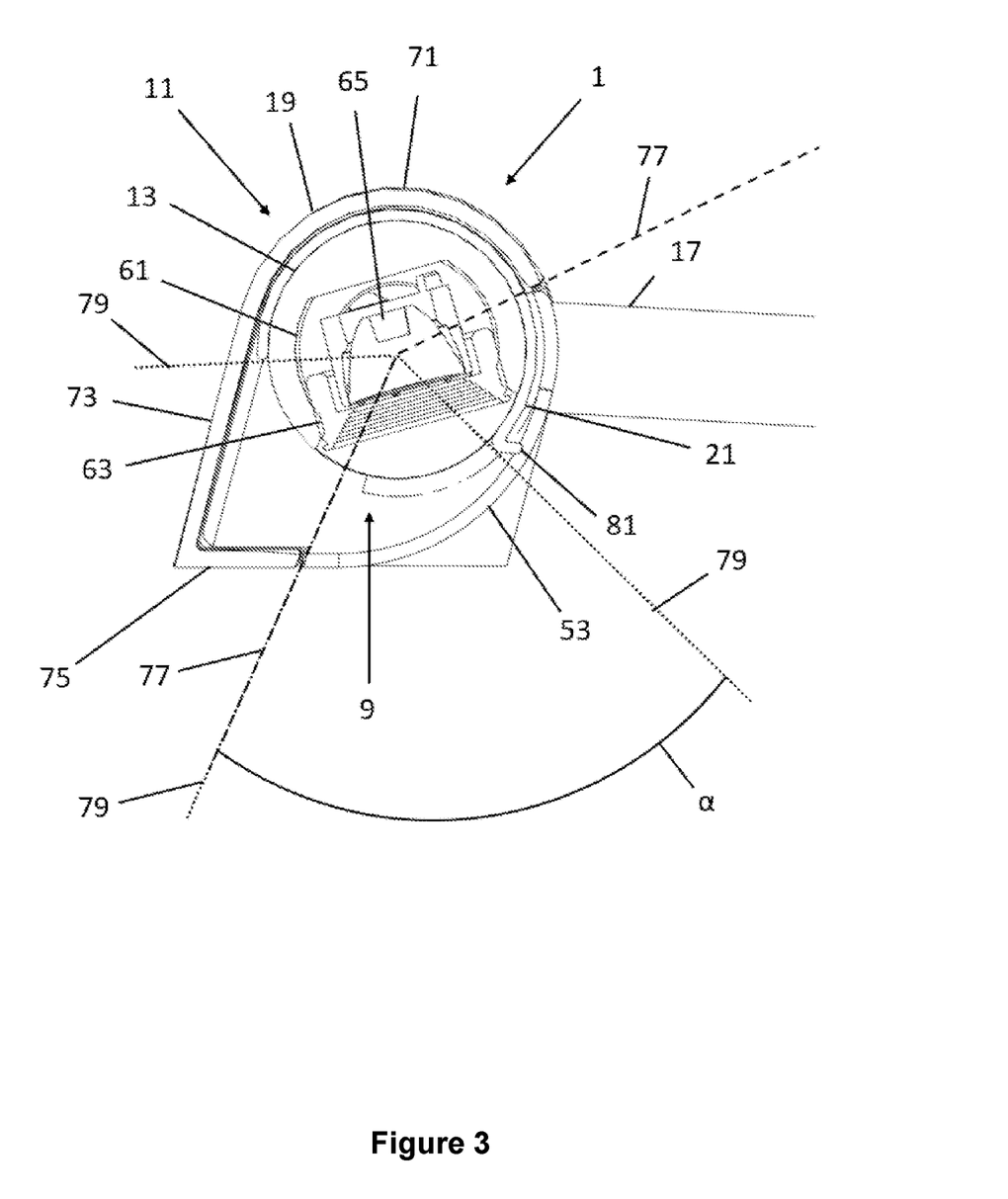
FIG. 3 is a cross-sectional view of the louvred lighting assembly of FIG. 1, taken along the line Y-Y shown in FIG. 2, and showing the outer louvre in a fully open position and an inner louvre in a partially shading position.
Figure 4:
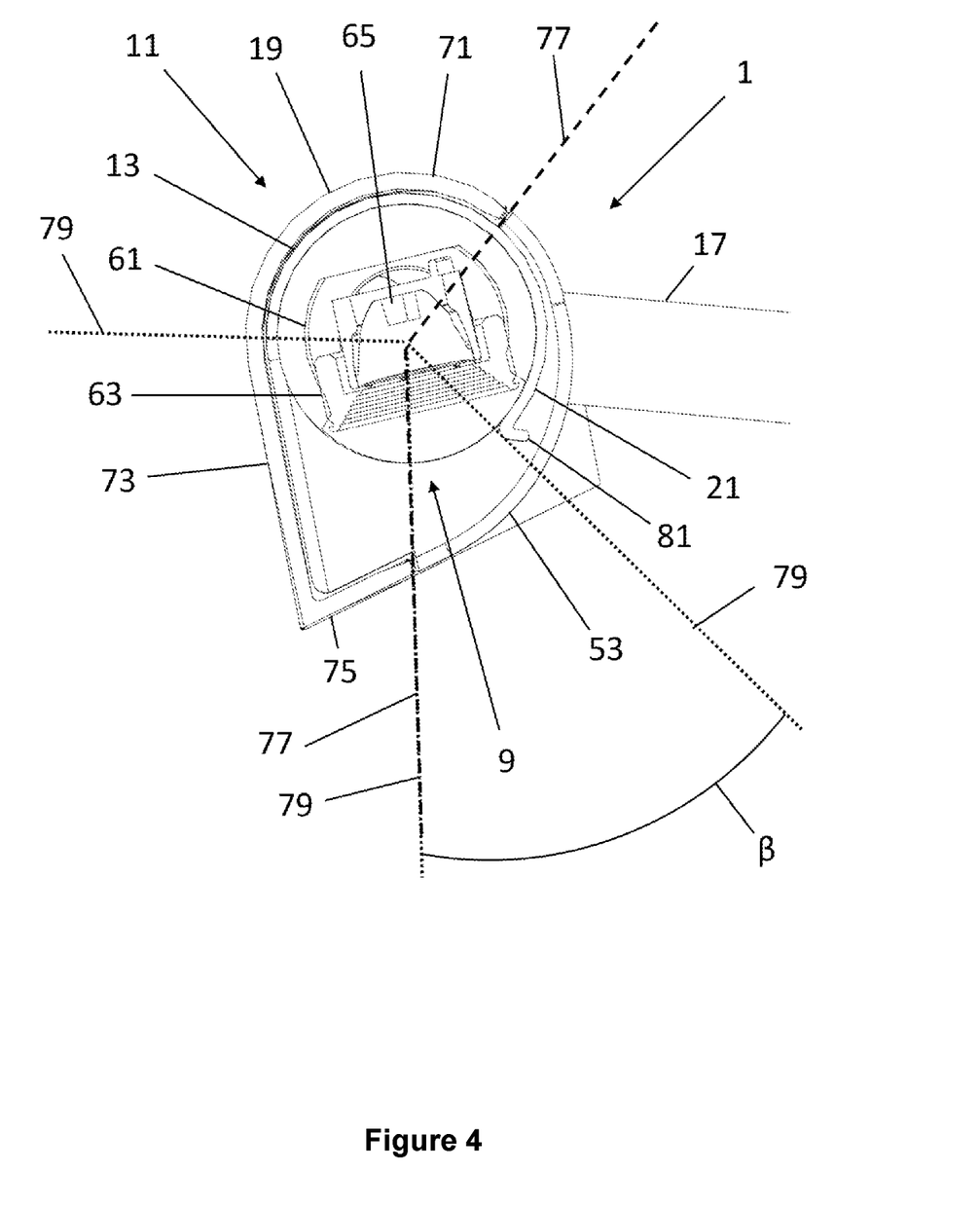
FIG. 4 is a cross-sectional view of the louvred lighting assembly of FIG. 1, taken along the line Y-Y shown in FIG. 2, and showing both the outer louvre and an inner louvre in a partially closed position.

The outer louvre 19 and an inner louvre 21 are shown in the cross-sectional image of FIG. 3. The outer louvre 19 can rotate in both a clockwise and in an anti-clockwise direction around the axis X-X. FIG. 3 shows the outer louvre 19 rotated fully clockwise such that it is in an open position, in which the degree to which the outer louvre 19 shades the illumination provided by the lighting arms 13 is at a minimum. The extent of the clockwise rotation of the outer louvre 19 is stopped by the support bracket 17, because when the edge of the outer louvre 19 contacts the support bracket 17 it cannot rotate any further. FIG. 3 shows the inner louvre 21 rotated partially clockwise such that it is in a partially closed position in which the inner louvre 21 partially shades the illumination provided by the lighting arms 13. FIG. 4 shows the outer louvre 19 rotated partially anti-clockwise and the inner louvre rotated partially clockwise so that the outer louvre 19 and the inner louvre 21 work together to shade the illumination provided by the lighting arms 13.

Figure 5:
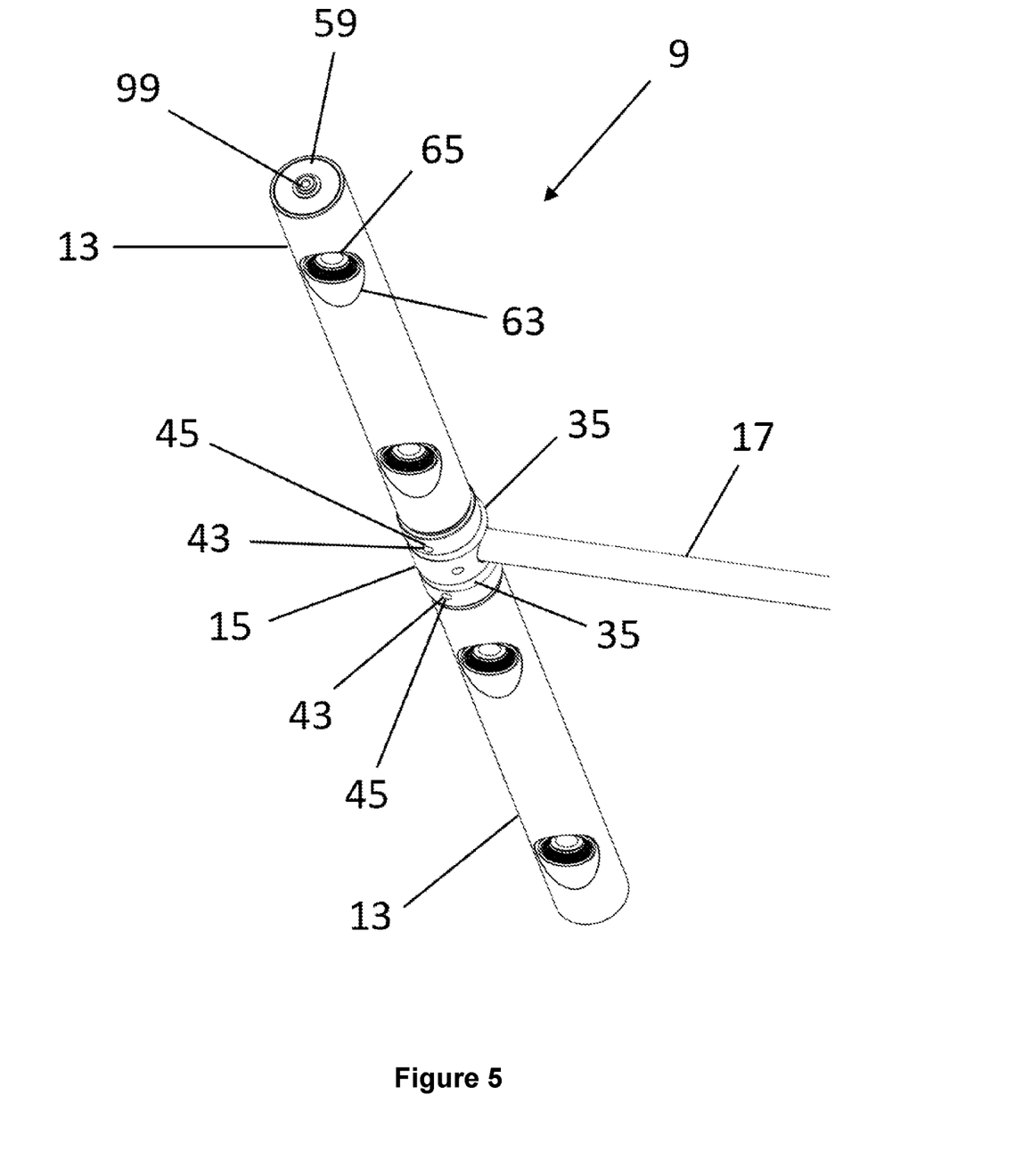
FIG. 5 is a perspective view of the lighting assembly without the louvre assembly.
Figure 6:
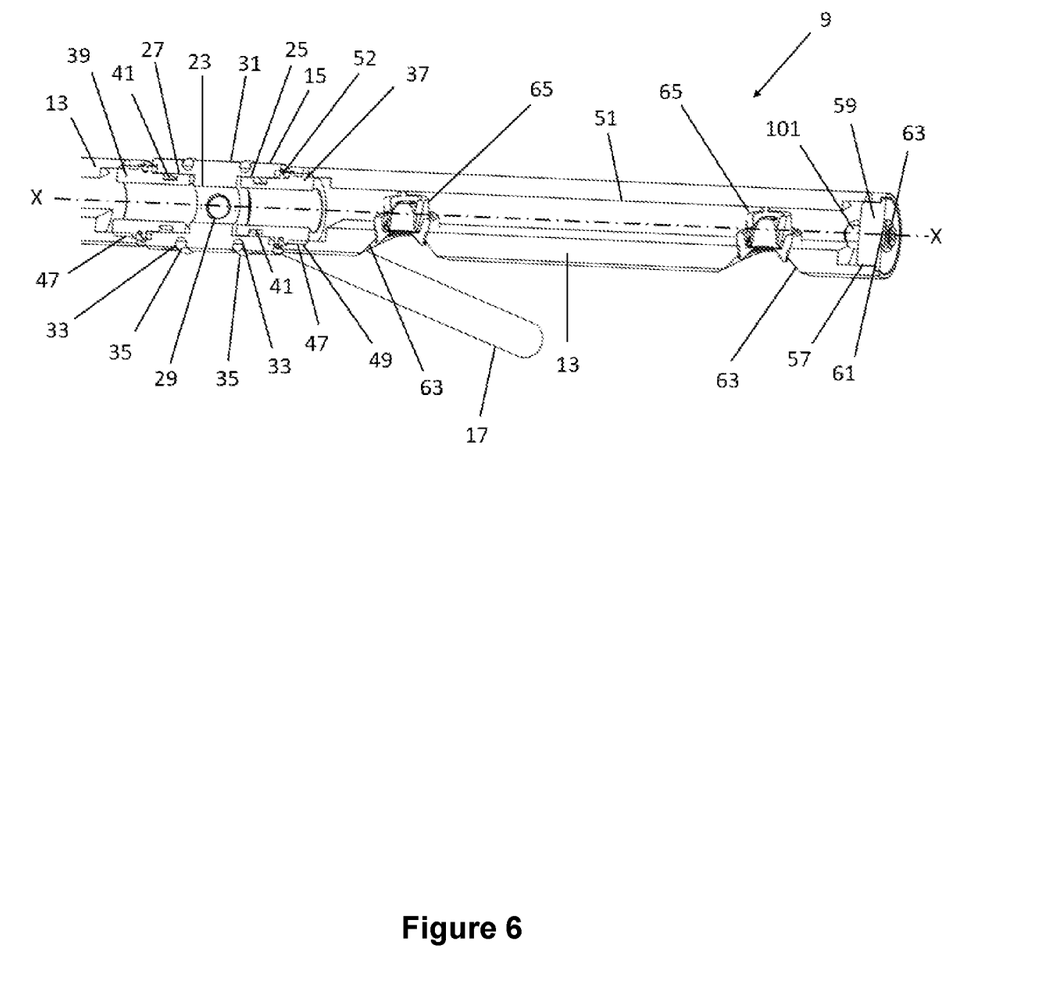
FIG. 6 is a cross-sectional view of the right hand side of the lighting assembly without the louvre assembly.

FIG. 5 shows the louvred lighting fixture 1 without the louvre assembly 11, so that the features of the lighting assembly 9 can be seen more clearly. The support bracket 17 is a tube and power supply wires (not shown) are routed through it in order to supply power to the lighting arms 13. The hub 15 is cylindrical and is provided with an offset bore 23, a right-hand socket 25 and a left-hand socket 27, as shown in the cross-sectional view of FIG. 6. The offset bore 23, the right-hand socket 25 and the left hand socket 27 are connected together so that there is a channel through the hub 15 from its right hand end to its left-hand end. A wiring conduit 29 is provided through the wall of the hub 15 midway between the ends of the hub 15 and runs between the external cylindrical surface 31 of the hub 15 and the offset bore 23. The support bracket 17 is fixed to the hub 15 and is aligned with the wiring conduit 29 so that power supply wires that are routed through the support bracket 17 pass through the wiring conduit 29 into the offset bore 23, along the offset bore 23 and through the right hand socket into one of the lighting arms 13, and along the offset bore 23 and through the left hand socket 27 into the other of the lighting arms 13. The external cylindrical surface 31 of the hub is provided with two annular grooves 33, one on either side of the wiring conduit 29. The annular grooves are concentric with the external cylindrical surface of the hub 15 and co-axial with the axis X-X. A nitrile rubber circular cross-section O-ring 35 is located in each one of the annular grooves 33.

Figure 9:
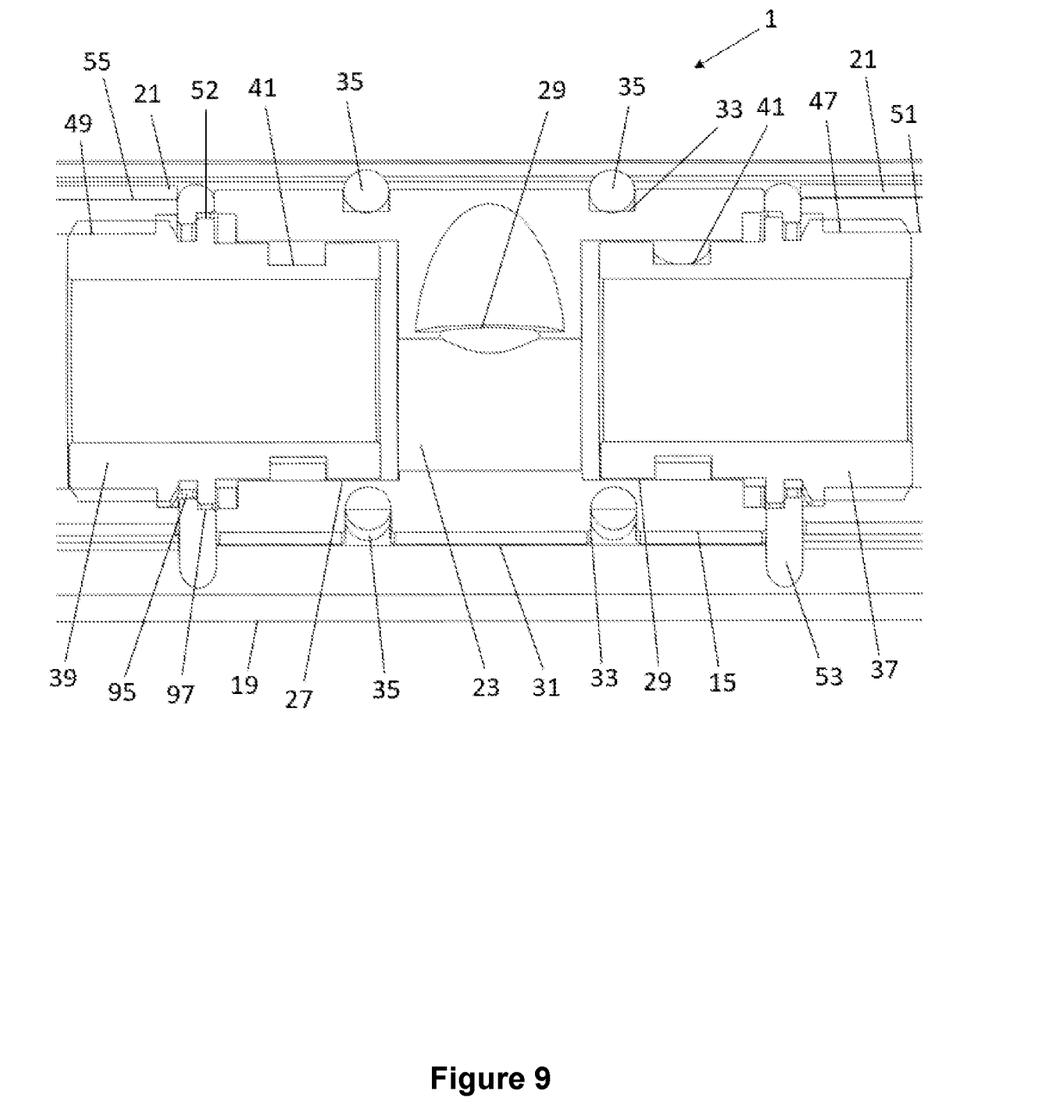
FIG. 9 is an offset cross-sectional view of the hub and the various components that are attached to it when the louvred lighting fixture has been assembled.

Located within the right-hand socket 25 and the left-hand socket 27 are a right-hand locking sleeve 37 and a left-hand locking sleeve 39, which are each a push fit within their respective sockets 25, 27, such that the right-hand locking sleeve 37 and the left-hand locking sleeve 39 can rotate relative to the hub 15 around axis X-X. Each locking sleeve 37,39 is provided with a grub screw slot 41 adjacent to its inward end (the inward end is the end nearest to the middle of the louvred lighting fixture 1, i.e. the point of the louvred lighting fixture 1 that is between its left-hand and right-hand ends). The grub screw slot 41 receives a grub screw 43 that is provided within a threaded grub screw hole 45 that passes through the wall of the hub 15 (as shown in FIG. 5). Each grub screw slot 41 extends around the circumference of the locking sleeve 37,39 to facilitate rotation of the lighting arms 13 over an angle of 60°. The outward end of each locking sleeve 37,39 is provided with a male helical screw thread 47 on its external surface and each male helical screw thread 47 is threadedly engaged with a female helical screw thread 49 provided on the internal surface of the inward end of a through-bore 51 in each lighting arm 13. Each locking sleeve 37,39 is also provided with an annular abutment collar 52 that is located between the helical screw thread 49 and the grub screw slot 41. A bracing plate 53 is located around each of the locking sleeves 37,39 and when each locking sleeve 37,39 is located in its respective socket 25,27, such that the grub screws 43 are located within the grub screw slots 41, the bracing plates 53 are located outside of the hub 15 and in close proximity to the ends of the hub 15 (for example as shown in FIG. 9).

The lighting arms 13 are elongate and cylindrical with an external cylindrical surface. The inward end of each through-bore 51 is provided with the female helical screw thread 49 and the outward end of each through-bore 51 is provided with a cylindrical stopper recess 57 that is aligned with the axis X-X. A cylindrical stopper 59 is located within the stopper recess 57 and it has an external diameter smaller than the internal diameter of the rotary support recess, so that the stopper 59 can fit within the stopper recess 57. The stopper 59 is fixed in the stopper recess 57 by a grub screw (not shown) that is located within a threaded bore (not shown) that passes through the wall of the lighting arm 13. A bore 61 is provided through the stopper 59 along the axis X-X. Two lamp apertures 63 are provided through the wall of the lighting arm 13 and the lamp apertures 63 are aligned with each other and with the axis X-X. A light emitting diode (LED) lamp 65 is located within each lamp aperture 63 and is directed to shine light away from the lighting arm 13.

Figure 7:
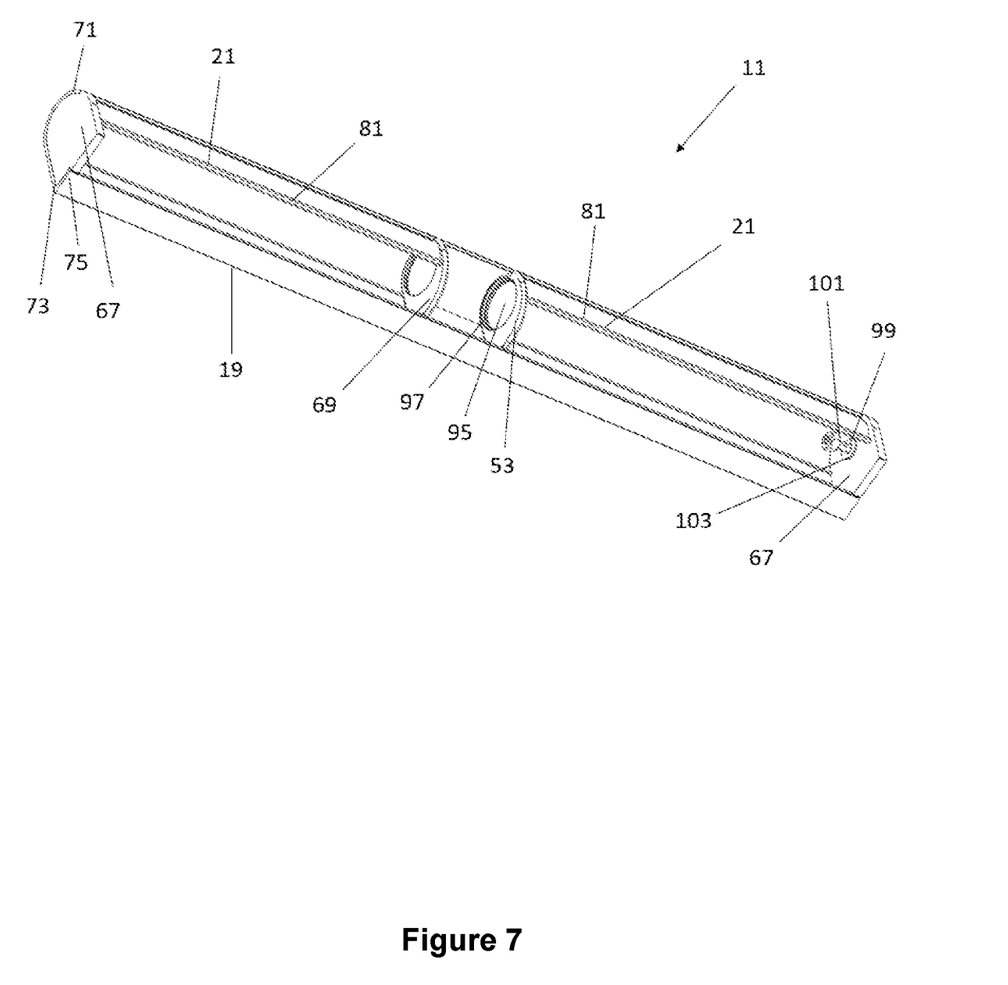
FIG. 7 is a perspective view of the louvre assembly viewed from the back.

FIG. 7 shows the louvre assembly 11 without the other parts of the louvred lighting fixture 1. The outer louvre 19 is provided at its left-hand end and at it right-hand end with an end cap 67. Each end cap 67 has an external profile that is complementary to the internal profile of the outer louvre 19. The forward-facing side of the end cap 67 (i.e. the side facing away from the wall 3) has an external profile that matches the internal profile of the outer louvre 19. The backward-facing side of the end cap 67 (i.e. the side facing towards the wall 3) has a profile such that when the louvred lighting fixture 1 is viewed from the left-hand side or the right-hand side the end cap 67 obscures the internal volume of the outer louvre 19. There is an interference fit between the outer louvre 19 and the end caps 67. The two bracing plates 53 are located within the outer louvre 19, either side of its mid-point.

An inner louvre 21 is located between each of the bracing plates 53 and each of the end caps 67. When the louvred lighting fixture 1 is assembled each inner louvre 21 is attached to a lighting arm 13. The inner louvres 21 are part circular in cross-sectional profile, with an inner diameter that is the same as the external diameter of the lighting arms 13. After the application of a surface coating to the lighting arms 13 and to the inner louvres 21, such as might be achieved by anodising those parts, so that there is a frictional engagement between an inner louvre 21 and the lighting arm 13 to which it is fitted. The part circular cross-sectional profile of the inner louvres 21 extends to just over a semi-circle, so that once the inner louvres 21 have been located over the lighting arms 13 during assembly (by being slid longitudinally in a direction along axis X-X or, less preferably, by being pushed over the lighting arms 13 in a direction transversely to longitudinal axis X-X) they can, in use, rotate relative to the lighting arms 13 around the axis X-X, but they cannot fall off.

The outer louvre 19 has a top face 71 which is partly cylindrical and which merges into a flat front face 73 which, in turn, merges into a flat bottom face 75. The included angle between the front face 73 and the bottom face 75 is acute and the bottom face 75 only extends a relatively short distance back from the front face 73. The outer louvre 19 therefore provides a left-hand elongate and rectangular outer illumination window 77, between the end of the flat bottom face 75 and the end of the partly cylindrical top face 71 and between the left-hand end cap 67 and the left-hand bracing plate 53 and a right-hand elongate and rectangular outer illumination window 77, between the end of the flat bottom face 75 and the end of the partly cylindrical top face 71 and between the right-hand end cap 67 and the right-hand bracing plate 53. Light from the lamps 65 can pass through these illumination windows 77, for the purposes of illuminating the painting 5. The right-hand illumination window is shown in FIG. 3. The dashed lines in FIG. 3 represent the arc of potential illumination from the lamps 65, dependent upon the relative rotational positions of the lighting arms 13 in the hub 15 and the outer louvre 19 around the hub 15. The outward ends of the outer louvre 19 are also open and receive the end caps 67.

The inner louvres 21 each provide an elongate and rectangular inner illumination window 79, between the edge adjacent to the lip 81 of the wall of the inner louvre 21 and the edge at the other end of the wall of the inner louvre. An elongate and rectangular inner illumination window 79 is shown in FIG. 3 by dotted lines. The outer illumination window 77 and the inner illumination window 79 overlap and the overlap defines a combined illumination window 80 which has an arc angle of α°, as shown in FIG. 3, or β°, as shown in FIG. 4. Consequently, there is a left-hand and a right-hand combined illumination window 80 created between the end of the flat bottom face 75 of the outer louvre 19 and the end of the inner louvre 21 that is located within the outer illumination window 77, and between an end cap 67 and a bracing plate 53.

The outer louvre 19 and the inner louvres 21 each have a relatively thin wall section and are cut from an aluminium alloy extrusion.

The internal diameter of the partly cylindrical top face 71 is slightly larger than the external diameter of the inner louvres 21, so that when the inner louvres 21 are fitted to the lighting arms 13, and the outer louvre 19 is mounted over the inner louvres 21, there is a clearance between the outer louvre 19 and the inner louvres 21. This enables the inner louvres 21 to be rotated around the axis X-X. Each inner louvre 21 is provided with a lip 81 along the one of its two straight edges that is parallel to axis X-X and that is located adjacent to the outer illumination window 77. The lip 81 extends outwardly a short distance from the external cylindrical surface of the inner louvre 21, so that the lip 81 provides a surface that a user's finger can grip in order to rotate the inner louvre 21 about the axis X-X. The lip 81 also acts as an end stop to limit the rotation of the inner louvre 21, for example, rotation of an inner louvre 21 in the anti-clockwise direction (viewed from FIG. 3) is stopped when the lip 81 comes into contact with the end of the cylindrical top face 71 of the outer louvre 19.

Figure 8:
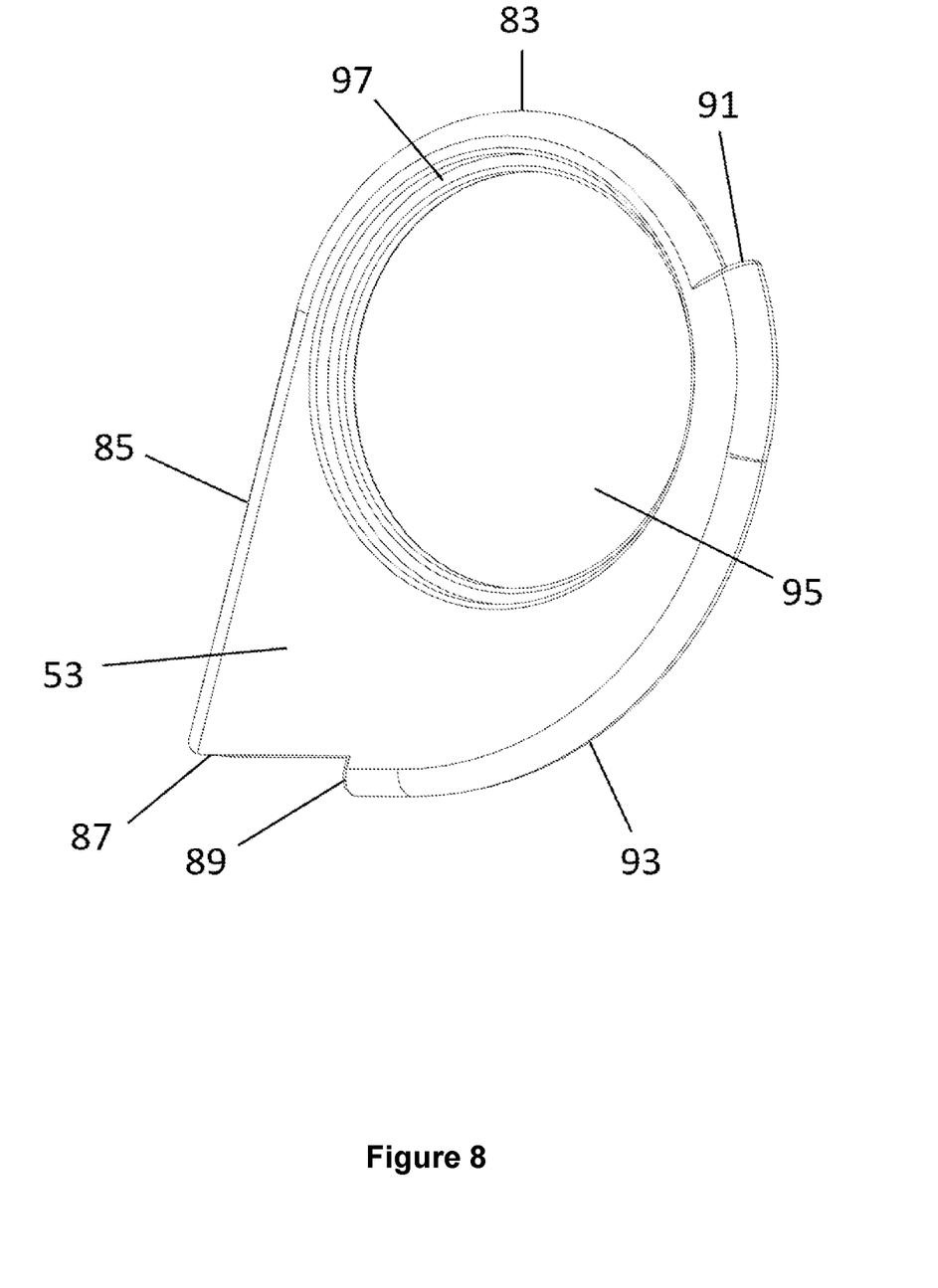
FIG. 8 is a perspective view of the left-hand bracing plate.

The left-hand bracing plate 53 is shown in FIG. 8. The external profile of the bracing plate 53 is complementary to the internal profile of the outer louvre 19. The external profile comprises an upper, partially circular, top edge 83, a straight front edge 85 and a straight bottom edge 87. The included angle between the front edge 85 and the bottom edge 87 is acute and the bottom edge 87 only extends a relatively short distance back from the front edge 85. A lower abutment 89 extends perpendicularly outwards from the end of the bottom edge 87 that is distant from the interface between the bottom edge 87 and the front edge 85. An upper abutment 91 extends perpendicularly outwards from the end of the top edge 83 that is distant from the interface between the top edge 83 and the front edge 85. A back edge 93 runs between the outward end of the lower abutment 89 and the outward end of the upper abutment 91. A circular locking sleeve aperture 95 is provided through the bracing plate 53 and is concentric with the partially circular top edge 83. The locking sleeve aperture 95 has a diameter that allows the outward threaded end of the left-hand locking sleeve 39 to pass through it. The left-hand locking sleeve 39 cannot pass entirely through the bracing plate 53 due to the annular abutment collar 52 having an outer diameter that is greater than the inner diameter of the locking sleeve aperture 95. The annular abutment collar 52 sits within an annular collar recess 97 that is coaxial with the locking sleeve aperture 95 and that is located on the inward side of the bracing plate 53.

The right-hand bracing plate 53 is a mirror image of the left hand bracing plate 53. The right-hand locking sleeve 37 has the same features as the left-hand locking sleeve 39 and consequently the right-hand bracing plate 53 and the right-hand locking sleeve 37 interact with each other in the same manner as described above. In the assembled louvred lighting fixture 1, each bracing plate 53 is held so that the locking sleeve aperture 95 is generally concentric with the axis X-X. Each bracing plate 53 is also held against an outward end of the hub 15 by the inner end of a lighting arm 13 so that there is a frictional engagement between the bracing plate 53 and the hub 15 that allows the bracing plate 53 to rotate relative to the hub 15.

The inward end of each inner louvre 21 is placed against the outward side of each bracing plate 53. An end cap 67 is held against the outward end of the inner louvre 21. The end cap 67 comprises a threaded stud 99 that is non-rotatably fixed to the inward side of the end cap 67 and which extends perpendicularly away from it. The stud 99 passes through the bore 61 of the stopper 59 and a locking nut 101 is threaded over the stud 99 to secure the end cap 67 to the stopper 59. A low friction washer 103 is located between the locking nut 101 and the stopper 59 and another low friction washer 103 is located between the stopper 59 and the end cap 67, so that when the locking nut 101 is tightened into its final position the low friction washers facilitate rotate of the end cap 67 relative to the stopper 59.

FIG. 9 is an offset cross-sectional view which shows the left-hand and right-hand bracing plates 53 located around their respective left-hand locking sleeve 39 and right-hand locking sleeve 37 and located with the outer louvre 19. The internal cross-section of the outer louvre 19 is dimensioned relative to the external profile of the bracing plates 53, such that there is clearance between the outward edge of the bracing plates 53 and the inside surface of the outer louvre 19. The rubber O-rings 35 have an external diameter that is larger than the internal diameter of the partially circular top face 71 of the outer louvre 19.

To assemble the lighting assembly 9, a lamp 65 is threadedly engaged with each of the four lamp apertures 63, two in each of the lighting arms 13. One lighting arm 13 is threadedly engaged with the left-hand locking sleeve 39 and the other lighting arm 13 is threadedly engaged with the right-hand locking sleeve 37. The left-hand locking sleeve 39 is located through the locking sleeve aperture 95 of the left-hand bracing plate 53 and the left-hand locking sleeve 39 is pushed into the left-hand socket 27. The right-hand locking sleeve 37 is located through the locking sleeve aperture 95 of the right-hand bracing plate 53 and the right-hand locking sleeve 37 is pushed into the right-hand socket 25. A grub screw 43 is screwed into the locking slot 41 of each of the lighting arms 13 to loosely secure the lighting arms 13 in position in the hub 15. The lighting arms 13 are then rotated around the axis X-X until the lamps 65 are pointing in the correct direction relative to the hub 15 (and the painting 5). Each grub screw 43 is then tightened until the lighting arms 13 are securely fixed to the hub 15 with the bracing plates 53 held between each outward end of the hub 15 and each inward end of the lighting arms 13. A rubber O-ring 35 is placed in each of the two annular grooves 33 of the hub 15 and the support bracket 17 is fixed to the hub 15 using a grub screw. During the assembly process power supply wires (not shown) are routed from the lamps 65, through the through-bore 51 of the lighting arms 13, the locking sleeves 37,39, the wiring conduit 29 in the hub 15 and through the support bracket 17.

To assemble the louvre assembly 11 onto the louvred lighting fixture 1, each of the two inner louvres 21 are located on to a lighting arm 13, either by sliding the inner louvre 21 over the lighting arm 13, or by pushing the inner louvre 21 against the lighting arm 13 so that the sides of the inner louvre 21 deflect to allow the inner louvre 21 to clip over the lighting arm 13. An assembly of an end cap 67 bolted to a rotary support disc 59 is then attached to the outward end of each lighting arm 13 by pushing the rotary support disc 59 into the rotary support recess 57. The end caps 67 are then aligned with each other and the outer louvre 19 is slid into position by pushing it over one end cap 67 and then up to the other end cap 67.

The interference fit between the internal profile of the outer louvre 19 and the external profile of the end caps 67 keeps the outer louvre 19 in position on the louvred lighting fixture 1 and thus prevents it from sliding left or right along the axis X-X. The rubber O-rings 35 deform when the outer louvre 19 is fitted over them because the rubber O-rings 35 have an outer diameter that is greater than the inner diameter of the top face 71 of the outer louvre. The frictional engagement between the rubber O-rings 35 and the inner surface of the outer louvre 39 holds the outer louvre 19 in place, but also allows the outer louvre 19 to be readily rotated around the axis X-X so that the outer illumination window 77 can be orientated to achieve the desired illumination of the painting 5. The frictional engagement between an inner louvre 21 and the lighting arm 13 to which is attached holds each inner louvre 21 in place, but also allows each inner louvre 21 to be readily rotated around the axis X-X so that the inner illumination window 79 can be orientated to achieve the desired illumination of the painting 5.

The figures referenced above illustrate a specific shape of the outer louvre 19. Other shapes of outer louvre 19 are envisaged, for example an outer louvre 19 with a square cross-section or an outer louvre 19 with a circular cross-section. In either case, the other parts of the louvred lighting fixture 1 are the same, or are modified to be complementary to the particular profile of the external louvre 19. For example, the external profile of the bracing plates 53 would be complementary to the internal profile of the particular profile of the external louvre 19.

That which is claimed is:

1. A louvred lighting fixture comprising:
   a lighting assembly and a louvre assembly,
   wherein the lighting assembly comprises a hub, a first lighting arm having a first light emitting device, and a second lighting arm having a second light emitting device,
   wherein an inner end of the first lighting arm is attached to the hub on the first side of the hub, and an inner end of the second lighting arm is attached to the hub on a second side of the hub, wherein the first side of the hub is located on an opposite side of the hub to the second side of the hub,
   wherein the louvre assembly comprises
      an outer louvre having a forward light obscuring region, and
      a first inner louvre and a second inner louvre, each having a rearward light obscuring region, wherein the first inner louvre and the second inner louvre are each at least partially located within the outer louvre,
   wherein there is a first engagement means for engaging the outer louvre with the lighting assembly, there is a second engagement means for engaging the first inner louvre with the first lighting arm, and there is a third engagement means for engaging the second inner louvre with the second lighting arm, the louvred lighting fixture having an axis of rotation X-X,
   wherein the first lighting arm, the outer louvre, the first inner louvre, and the second inner louvre each have a longitudinal axis of rotation that is coaxial with the axis of rotation X-X, so that, in use, when the first lighting arm, the outer louvre, the first inner louvre, and the second inner louvre are rotated about their respective longitudinal axes of rotation, they are also rotated about axis X-X,
   wherein the first light emitting device is arranged so that, in use, it directs a beam of light transversely to the longitudinal axis of the first lighting arm,
   wherein the second light emitting device is arranged so that, in use, it directs a beam of light transversely to the longitudinal axis of the second lighting arm,
   wherein the outer louvre and the first inner louvre are arranged so that, in use, the outer louvre and the first inner louvre can be rotated about axis X-X so that the forward light obscuring region and the rearward light obscuring region can be positioned at least partially within the beam of light emitted by the first light emitting device, and
   wherein the second inner louvre is arranged so that, in use, the second inner louvre can be rotated about axis X-X so that the rearward light obscuring region can be positioned at least partially within the beam of light emitted by the second light emitting device.

2. A louvred lighting fixture as claimed in claim 1, wherein the outer louvre extends over at least part of the hub, the first engagement means engages the outer louvre with the hub and the first engagement means is located between an external surface of the hub and an internal surface of the outer louvre.

3. A louvred lighting fixture as claimed in claim 1, wherein the first inner louvre extends over at least a part of the first lighting arm and the second engagement means is provided by frictional engagement of an external surface of the first lighting arm with an internal surface of the first inner louvre.

4. A louvred lighting fixture as claimed in claim 2, wherein the first engagement means is an elastically resilient element that frictionally engages with the outer louvre and the hub in a manner that permits relative movement of the outer louvre relative to the hub when a user applies a force to the outer louvre.

5. A louvred lighting fixture as claimed in claim 1, wherein the first lighting arm is cylindrical and the first inner louvre has an open cross-sectional profile that extends around an arc of a circle by more than 180° but less than 360°, wherein an internal diameter of a circular cross-sectional profile of the first inner louvre is less than an outer diameter of the first lighting arm, such that at least a part of the first inner louvre is an interference fit with the first lighting arm.

6. A louvred lighting fixture as claimed in claim 1, wherein, in use, the hub is fixed so that it does not rotate or articulate.

7. A louvred lighting fixture as claimed in claim 1, wherein the first lighting arm and the second lighting arm are rotationally attached to the hub.

8. A louvred lighting fixture as claimed in claim 1, wherein each of the first inner louvre and the second inner louvre has an open cross-sectional profile that extends around an arc of a circle by more than 180° but less than 360°, wherein an internal diameter of a circular cross-sectional profile of the first inner louvre and of the second inner louvre is less than an outer diameter of the first lighting arm and of the second lighting arm respectively, such that at least a part of the first inner louvre is an interference fit with the first lighting arm and such that at least a part of the second inner louvre is an interference fit with the second lighting arm, wherein the cross-sectional profile is constant along an entire length of the first lighting arm and the second lighting arm.

9. A louvred light fixture as claimed in claim 1, wherein an outer illumination window is provided in a wall of the outer louvre and an inner illumination window is provided in a wall of the first inner louvre, wherein the outer illumination window and the inner illumination window overlap to create a combined illumination window.

10. A louvred lighting fixture as claimed in claim 9, wherein the outer louvre has an open cross-sectional profile that is constant along an entire length of the outer louvre, and an end cap is located at each end of the outer louvre, wherein the outer illumination window is defined by the end caps and by longitudinal edges of the open cross-sectional profile of the outer louvre.

11. A louvred lighting fixture as claimed in claim 9, wherein the first inner louvre has an open cross-sectional profile that is constant along an entire length of the first inner louvre, wherein the inner illumination window is defined by longitudinal edges of the open cross-sectional profile of the first inner louvre, by an end cap of the outer louvre, and by a bracing plate.

12. A louvred light fixture as claimed in claim 11, wherein the bracing plate is located adjacent to the first side of the hub, and between the hub and the first inner louvre, wherein an external profile of the bracing plate is complementary to an internal profile of the outer louvre such that at least part of an external profile of the bracing plate is held in contact with an internal profile of the outer louvre.

13. A louvred lighting fixture as claimed in claim 9, wherein the first inner louvre fits within the outer illumination window of the outer louvre.

14. A louvred lighting fixture comprising:
a lighting assembly and a louvre assembly,
wherein the lighting assembly comprises a hub, a first lighting arm having a first light emitting device, and a second lighting arm having a second light emitting device,
wherein an inner end of the first lighting arm is attached to the hub on a first side of the hub, and an inner end of the second lighting arm is attached to the hub on a second side of the hub, wherein the first side of the hub is located on an opposite side of the hub to the second side of the hub,
wherein the louvre assembly comprises an outer louvre having a forward light obscuring region and a first inner louvre having a rearward light obscuring region,
wherein the outer louvre is provided with a rotational engagement means at each end, the first lighting arm is provided with a rotational engagement means at its outer end and the second lighting arm is provided with a rotational engagement means at its outer end, wherein the rotational engagement means at one end of the outer louvre is engaged with the rotational engagement means at the outer end of the first lighting arm and the rotational engagement means at the other end of the outer louvre is engaged with the rotational engagement means at the outer end of the second lighting arm,
wherein there is a first engagement means for engaging the outer louvre with the lighting assembly and there is a second engagement means for engaging the first inner louvre with the first lighting arm, the louvred lighting fixture having an axis of rotation X-X,
wherein the first lighting arm, the outer louvre and the first inner louvre each have a longitudinal axis of rotation that is coaxial with the axis of rotation X-X, so that, in use, when the first lighting arm, the outer louvre and the first inner louvre are rotated about their respective longitudinal axes of rotation, they are also rotated about axis X-X,
the first light emitting device is arranged so that, in use, it directs a beam of light transversely to the longitudinal axis of the first lighting arm, and
the outer louvre and the first inner louvre are arranged so that, in use, the outer louvre and the first inner louvre can be rotated about axis X-X so that the forward light obscuring region and the rearward light obscuring region can be positioned at least partially within the beam of light emitted by the first light emitting device.

15. A louvred lighting fixture comprising:
a lighting assembly and a louvre assembly,
wherein the lighting assembly comprises a hub, a first lighting arm having a first light emitting device, and a second lighting arm having a second light emitting device,
wherein an inner end of the first lighting arm is attached to the hub on a first side of the hub, and an inner end of the second lighting arm is attached to the hub on a second side of the hub, wherein the first side of the hub is located on an opposite side of the hub to the second side of the hub,
wherein the louvre assembly comprises an outer louvre having a forward light obscuring region and a first inner louvre having a rearward light obscuring region,
wherein the hub, the first lighting arm, the second lighting arm, the first inner louvre and a second inner louvre are all located within the outer louvre,
wherein there is a first engagement means for engaging the outer louvre with the lighting assembly and there is a second engagement means for engaging the first inner louvre with the first lighting arm, the louvred lighting fixture having an axis of rotation X-X,
wherein the first lighting arm, the outer louvre and the first inner louvre each have a longitudinal axis of rotation that is coaxial with the axis of rotation X-X, so that, in use, when the first lighting arm, the outer louvre and the first inner louvre are rotated about their respective longitudinal axes of rotation, they are also rotated about axis X-X,
the first light emitting device is arranged so that, in use, it directs a beam of light transversely to the longitudinal axis of the first lighting arm, and
the outer louvre and the first inner louvre are arranged so that, in use, the outer louvre and the first inner louvre can be rotated about axis X-X so that the forward light obscuring region and the rearward light obscuring region can be positioned at least partially within the beam of light emitted by the first light emitting device.

* * * * *